R. B. CALCUTT.
TIRE FOR VEHICLES.
APPLICATION FILED JULY 28, 1913.

1,104,774.

Patented July 28, 1914.

Witnesses:
Robert H. Weir
E. Lundy.

Inventor
Reginald B. Calcutt
By Frank D. Thomason,
Atty.

UNITED STATES PATENT OFFICE.

REGINALD B. CALCUTT, OF CHICAGO, ILLINOIS.

TIRE FOR VEHICLES.

1,104,774. Specification of Letters Patent. Patented July 28, 1914.

Application filed July 28, 1913. Serial No. 781,577.

*To all whom it may concern:*

Be it known that I, REGINALD B. CALCUTT, a citizen of the United States, residing at Chicago, in the county of Cook and State of Illinois, have invented new and useful Improvements in Tires for Vehicles, of which the following is a full, clear, and exact description.

My invention relates to the type of solid rubber tires, the ends of which are adapted to be drawn together upon the concaved rim of the wheel and fastened together. Heretofore tires of this character have been made having a wire threaded through them and the ends of this wire extended beyond the ends of the tire and were suitably united by twisting them together or by the employment of other means.

My invention more particularly relates to tires of this character that have a coiled wire core forming a skeleton for the walls of the axial bore thereof.

The principal object of my invention is to screw the extended ends of the coiled wire core either into each other, or into some simple medium which will unite them together, and to confine these ends in this united relationship by a sleeve or envelop of rubber or other material, which fills in the space between the ends of the rubber tire and corresponds in diameter to the same. This I accomplish by the means hereinafter described, and as more particularly pointed out in the claims.

Figure 1:
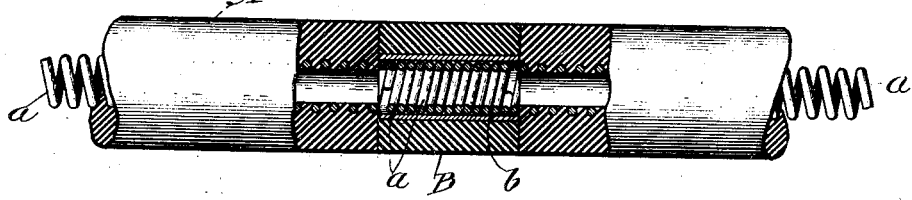
Figure 2:
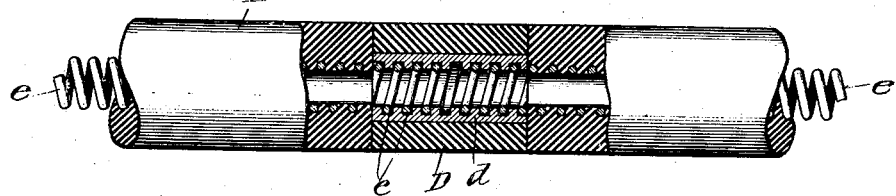
Figure 3:
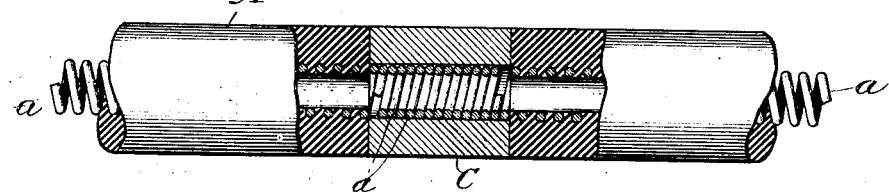
Figure 4:
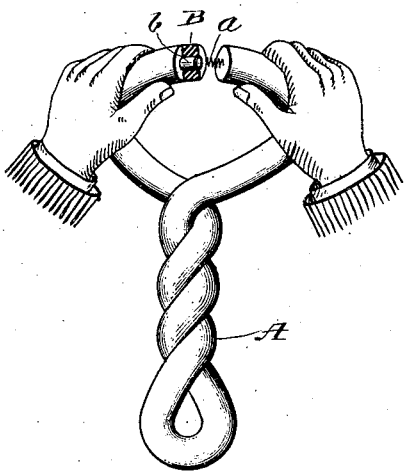

In the drawings: Figure 1 is a longitudinal central section of a portion of said tire showing the interlocking of the ends thereof by means of my improvements. Fig. 2 is a similar view of a modified construction thereof. Fig. 3 is a similar view of yet another modification. Fig. 4 is a perspective view of a tire embodying my improvements and illustrating the manner in which the ends of the tire are manipulated when they are being united.

Referring to the drawings, A, represents a tire comprising a coiled wire core $a$, the convolutions of which are open or separated, and the ends of which extend, say, one-half of an inch beyond the ends of the rubber composition of the tire, which latter intermeshes with said convolutions and is solid between the same and the circumference of the tire.

B represents a rubber sleeve which is of the same diameter as the body of the tire, and is of a length corresponding to or slightly greater than the ends of the wire core that extend beyond the rubber. This sleeve has a bore of the same diameter as the coiled wire, and it is slid over one of the projecting ends of the coiled wire core and then the other projecting end of said core is brought into axial alinement and the two are screwed together until the rubber ends of the tire come in contact with the ends of the sleeve.

In order to screw the projecting ends of the coiled wire core $a$ together, the tire is twisted in the reversed direction to the screwing movement until it is practically in the shape shown in Fig. 4 of the drawings. The ends of the tire are then grasped, as shown in said figure, and screwed together until the kinks in the tire are all straightened out and said tire assumes the shape of a simple loop of a more or less circular shape, preparatory to its being snapped into its concaved seat in the rim of the wheel.

I prefer to provide sleeve B with a tubular metal core $b$, as shown in Fig. 1 of the drawings, but, if desired, this sleeve may be made of solid rubber or other material C, as shown in Fig. 3 of the drawings. I prefer to use the sleeve with the tubular core $b$, however, as it prevents any independent lateral movement of the interlocking ends of the coiled wire core $a$, and consequent chewing or wearing of the walls of the bore of the sleeve, and avoids the possibility of the bore of the sleeve wearing away and becoming larger, and thus resulting in a loose joint between the ends of the tire proper.

In Fig. 2, I have shown a modified construction of my invention which consists of a sleeve D and a tubular metal core $d$, the bore of which latter is screw-threaded, substantially as shown. The ends of the coiled wire core $e$, $e$, of the tire E do not project beyond the ends of the rubber exterior thereof a distance greater than one-half of the length of said sleeve D, and when the ends of the tire are being united the tire is manipulated as shown in Fig. 4 of the drawings, and the extended ends of the coiled wire core $e$ are screwed into the sleeve until their extremities reach or come near the center of length of the bore of the metal tubular core of the sleeve. In this position said sleeve D will fill in the space between the ends of the rubber portion of the tire, and the ends of the latter will be securely fastened together.

What I claim as new is:

1. A tire for vehicles comprising a cylindrical body of suitable material, a coiled wire core enveloped within and extending longitudinally through the same, and a sleeve of the same shape in cross-section as said body and having a continuous bore therethrough in alinement with the ends of said coil which extend beyond the end of said body and enter and are secured within said sleeve.

2. A tire for vehicles comprising a coiled wire core, a substantially concentric cylindrical body within which said core is enveloped to within a short distance of the ends thereof, and a sleeve conforming in cross-section to said body and having a continuous bore therethrough in alinement with the ends of said coil, which latter enter said bore and are connected within the same.

3. A tire for vehicles comprising a coiled wire core, a concentric cylindrical body within which said core is molded and enveloped to within a short distance of the ends thereof, and a sleeve conforming in cross-section to said body and having a continuous bore therethrough in alinement with the ends of said coil, a tubular core within said sleeve within which said ends are inserted and connected together.

In witness whereof I have hereunto set my hand this 25th day of July, 1913.

REGINALD B. CALCUTT.

Witnesses:
FRANK D. THOMASON,
E. K. LUNDY.